(12) United States Patent
Newlin et al.

(10) Patent No.: US 11,459,131 B2
(45) Date of Patent: *Oct. 4, 2022

(54) SATELLITE WITH A THERMAL SWITCH AND ASSOCIATED METHODS

(71) Applicant: HARRIS CORPORATION, Melbourne, FL (US)

(72) Inventors: Christopher R. Newlin, Melbourne, FL (US); Alan W. Mast, Melbourne Beach, FL (US)

(73) Assignee: HARRIS CORPORATION, Melbourne, FL (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/092,972

(22) Filed: Nov. 9, 2020

(65) Prior Publication Data

US 2021/0053701 A1 Feb. 25, 2021

Related U.S. Application Data

(62) Division of application No. 15/687,808, filed on Aug. 28, 2017, now Pat. No. 10,865,000.

(51) Int. Cl.
*B64G 1/50* (2006.01)
*B64G 1/66* (2006.01)
*B64G 1/10* (2006.01)

(52) U.S. Cl.
CPC ............. *B64G 1/50* (2013.01); *B64G 1/10* (2013.01); *B64G 1/503* (2013.01); *B64G 1/66* (2013.01)

(58) Field of Classification Search
CPC ..... B64G 1/50; B64G 1/503; G05D 23/27543
See application file for complete search history.

(56) References Cited

U.S. PATENT DOCUMENTS

| | | | | |
|---|---|---|---|---|
| 3,390,717 A | * | 7/1968 | Townsend | F28F 13/00 165/277 |
| 3,463,224 A | | 8/1969 | Myers | |
| 3,489,203 A | * | 1/1970 | Fischell | F28D 15/06 165/277 |
| 4,374,402 A | | 2/1983 | Blessom et al. | |
| 5,332,030 A | * | 7/1994 | Spencer | F28D 15/0275 165/41 |

(Continued)

FOREIGN PATENT DOCUMENTS

| | | |
|---|---|---|
| EP | 1006769 | 6/2000 |
| JP | H01195626 A * | 8/1989 |
| WO | 2016051786 | 7/2016 |

OTHER PUBLICATIONS

Bulgrin "An Investigation of a Tunable Magnetomechanical Thermal Switch" J. Heat Transfer 133(10), 101401 (Aug. 11, 2011) (7 pages) Abstract Only See Priority U.S. Appl. No. 15/687,808, filed Aug. 28, 2017.

*Primary Examiner* — Brian M O'Hara
(74) *Attorney, Agent, or Firm* — Allen, Dyer, Doppelt + Gilchrist, P.A.

(57) ABSTRACT

A satellite includes a satellite housing, a temperature sensitive component carried by the satellite housing, and a thermal radiator carried by the satellite housing. A thermal switch is movable between a coupled state and a decoupled state. In the coupled state, the temperature sensitive component and the thermal radiator are thermally coupled. In the decoupled state, the temperature sensitive component and the thermal radiator are thermally decoupled.

21 Claims, 4 Drawing Sheets

(56) References Cited

U.S. PATENT DOCUMENTS

| | | |
|---|---|---|
| 5,535,815 A | 7/1996 | Hyman |
| 5,771,967 A | 6/1998 | Hyman |
| 5,875,096 A * | 2/1999 | Gates .................... H01L 23/10 |
| | | 257/E23.09 |
| 5,957,408 A | 9/1999 | Hall et al. |
| 6,326,879 B1 | 12/2001 | Hangman et al. |
| 6,511,021 B1 | 1/2003 | Keramidas |
| 6,595,004 B1 | 7/2003 | Ghoshal |
| 6,768,412 B2 | 7/2004 | Becka et al. |
| 7,967,256 B2 * | 6/2011 | Wong .................... B64G 1/506 |
| | | 244/171.8 |
| 2011/0168378 A1 | 7/2011 | Hsu |

* cited by examiner though presented in one embodiment of the

SATELLITE WITH A THERMAL SWITCH AND ASSOCIATED METHODS

TECHNICAL FIELD

The present invention relates to the field of satellites, and more particularly, to a thermal switch for a temperature sensitive component within a satellite and related methods.

BACKGROUND

The number of small satellites for commercial and government uses is significantly increasing. Small satellites are characterized as satellites of low mass and size, usually under 500 kg. A low earth orbit (LEO) is used by a vast majority of small satellites. The altitude range of small satellites in a low earth orbit is within a range of about 200 and 1200 km above the Earth's surface, with an orbital period within a range of about 84 to 127 minutes.

A variety of different types of small satellites use the LEO orbit levels. Small satellites may be used to provide worldwide voice and data communications for hand-held satellite phones and other transceiver units, for example. Another application of small satellites is to monitor the surface of the earth.

Satellites in general experience extreme changes in temperature when orbiting the earth. Extreme temperature changes can have adverse effects on temperature sensitive components within the satellites. Consequently, temperature sensitive components need to be kept within certain temperature ranges.

When temperature sensitive components are powered on, thermal radiators may be used to dump or radiate heat to cold space to keep the temperature sensitive components from getting too hot. When temperature sensitive components are powered off, heaters may be used to keep the temperature sensitive components from getting too cold.

However, when a temperature sensitive component coupled to a thermal radiator is powered off, the thermal radiator may continue to radiate heat to cold space. This means that the heater consumes additional DC power to compensate for the heat being radiated by the thermal radiator. Since the solar panels for small satellites are limited in size, their battery charging capabilities are limited as well. Consequently, there is a need for small satellites to conserve DC power consumption.

SUMMARY

A satellite includes a satellite housing, a temperature sensitive component carried by the satellite housing, a thermal radiator carried by the satellite housing, and a thermal switch. The thermal switch may be moved between a coupled state and a decoupled state. In the coupled state, the temperature sensitive component and the thermal radiator may be thermally coupled. In the decoupled state, the temperature sensitive component and the thermal radiator may be thermally decoupled. The thermal switch, when in the decoupled state, may define a vacuum gap between the temperature sensitive component and the thermal radiator.

The thermal switch advantageously helps the satellite conserve DC power when the thermal radiator is thermally decoupled from the temperature sensitive component. The thermal decoupling prevents the thermal switch from radiating valuable heat from the temperature sensitive component when the temperature sensitive component is powered off. As a result, less DC power is needed to heat the temperature sensitive component when the thermal radiator is thermally decoupled from the temperature sensitive component.

The thermal switch may comprise an electromagnetically operated actuator. In one embodiment, the electromagnetically operated actuator may comprise a solenoid coil, and at least one flexure mount coupled between the temperature sensitive component and the thermal radiator. In another embodiment, the electromagnetically operated actuator may comprise at least one solenoid fastener coupled between the temperature sensitive component and the thermal radiator.

A compressible thermal interface layer may be between the temperature sensitive component and the thermal radiator when the thermal switch is in the coupled state.

The satellite may further comprise a temperature sensor associated with the temperature sensitive component, and a controller to operate the thermal switch based upon the temperature sensor to maintain the temperature sensitive component within a temperature range. The satellite may further comprise a heater associated with the temperature sensitive component and controllable by the controller. The temperature sensitive component may comprise an electronic circuit device or a battery, for example.

Another aspect is directed to a method of maintaining the temperature sensitive component of the satellite within a temperature range. The method may comprise selectively operating a thermal switch movable between a coupled state and a decoupled state to thereby maintain the temperature sensitive component within the temperature range. In the coupled state, the temperature sensitive component and a thermal radiator may be thermally coupled. In the decoupled state, the temperature sensitive component and the thermal radiator may be thermally decoupled.

DETAILED DESCRIPTION

The present disclosure will now be described more fully hereinafter with reference to the accompanying drawings, in which preferred embodiments of the disclosure are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
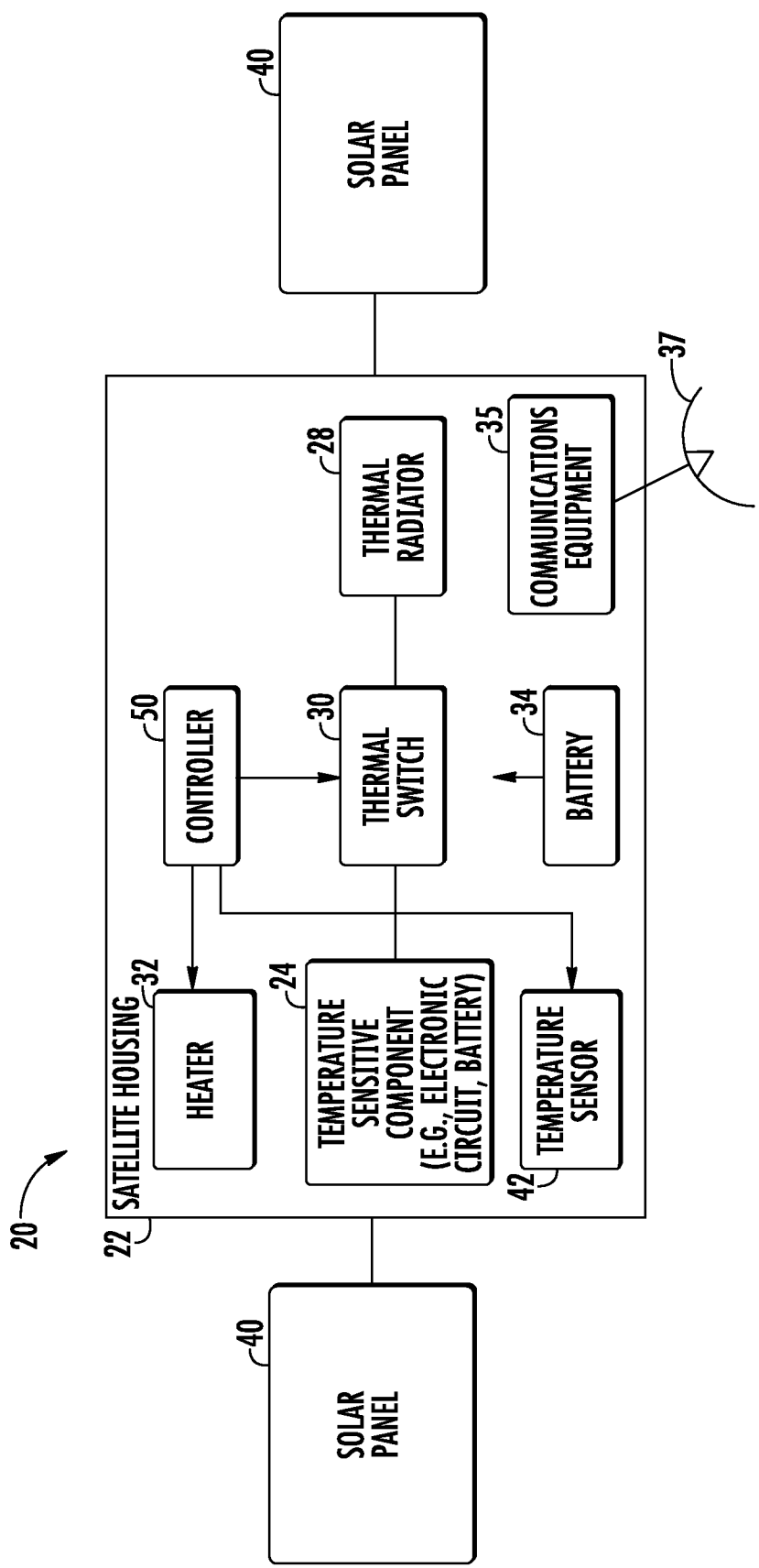
FIG. 1 is a block diagram of a satellite with a thermal switch for a temperature sensitive component in accordance with the disclosure.

Referring initially to FIG. 1, a satellite 20 includes a satellite housing 22, a temperature sensitive component 24, a thermal radiator 28, and a thermal switch 30. The temperature sensitive component 24, the thermal radiator 28, and the thermal switch 30 are carried by the satellite housing 22. The satellite housing 22 may be the main body of the satellite 20, as illustrated. Alternatively, the satellite housing 22 may be carried on a support arm away from the main body of the satellite 20. The satellite 20 further includes communications equipment 35 and an antenna 37 coupled thereto.

The thermal switch 30 is movable between a coupled state and a decoupled stated. In the coupled state, the temperature sensitive component 24 is thermally coupled to the thermal radiator 28. In the decoupled state, the temperature sensitive component 24 is thermally decoupled from the thermal radiator 28. When the thermal switch 30 is in the decoupled state, a vacuum gap 33 is defined between the temperature sensitive component 24 and the thermal radiator 28.

The thermal switch 30 advantageously helps the satellite 20 conserve DC power when the thermal radiator 28 is thermally decoupled from the temperature sensitive component 24 while the temperature sensitive component 24 is being heated by a heater 32. This prevents the thermal switch 30 from radiating valuable heat from the temperature sensitive component 24 when the temperature sensitive component 24 is powered off. As a result, less DC power is needed to heat the temperature sensitive component 24 when the thermal radiator 28 is thermally decoupled from the temperature sensitive component 24.

The satellite 20 operates on DC power provided by a battery 34. Solar panels 40 are used to charge the battery 34. The satellite 20 may be a low earth orbit (LEO) satellite, for example. LEO satellites are often referred to as small satellites since they are characterized as having low mass and size.

The solar panels 40 for a small satellite are limited in size, which means their battery charging capabilities are limited as well. Decoupling the thermal radiator 28 from the temperature sensitive component 24 allows the satellite 20 to conserve DC power consumption when operating a heater 32 to heat the temperature sensitive component 24.

The heater 32 may be external the temperature sensitive component 24, as illustrated. Alternatively, the heater 32 may be internal the temperature sensitive component 24, as readily understood by those skilled in the art.

The satellite 20 further includes a temperature sensor 42 associated with the temperature sensitive component 24. A controller 50 is configured to operate the heater 32 and the thermal switch 30 based upon the temperature sensor 42. When the small satellite 20 is closer to the earth during its rotation, then it may be shadowed from the sun for about 20 to 30 minutes. Shadowing of the small satellite 20 thus contributes to low temperature extremes.

Overall the small satellite 20 may experience a temperate range of −55° C. to +200° C. When the temperature sensitive component 24 is an electronic circuit device, it is typically limited to a temperature range of −40° C. to +85° C., for example, to avoid being damaged. The electronic circuit device may be a microprocessor or a high power amplifier (HAP), for example. When the temperature sensitive component 24 is a battery, for example, it has an even more limited temperature range. Batteries are typically limited to a temperature range of +10° C. to +50° C., for example.

Figure 2:
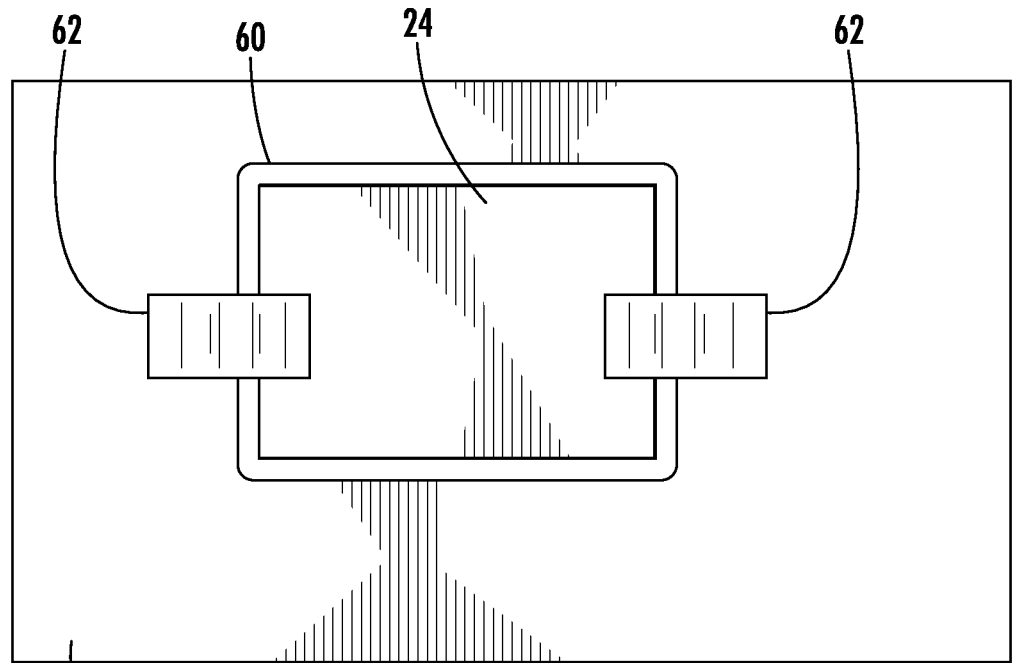
FIG. 2 is a top view of the temperature sensitive component illustrated in FIG. 1 with one embodiment of the thermal switch.
Figure 3:
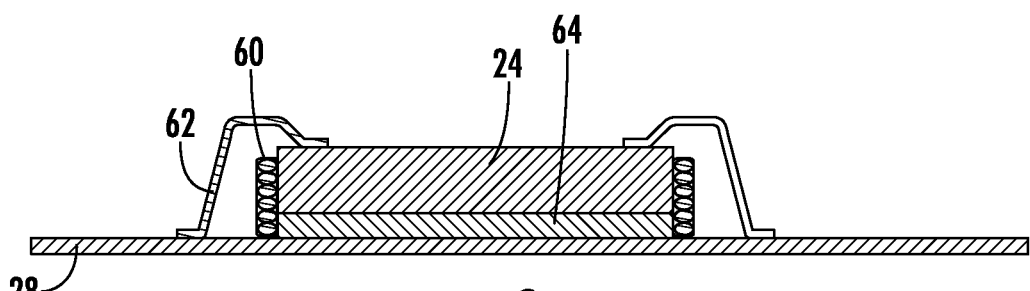
FIG. 3 is a cross-sectional side view of the temperature sensitive component illustrated in FIG. 2 with the thermal switch in a coupled state.
Figure 4:
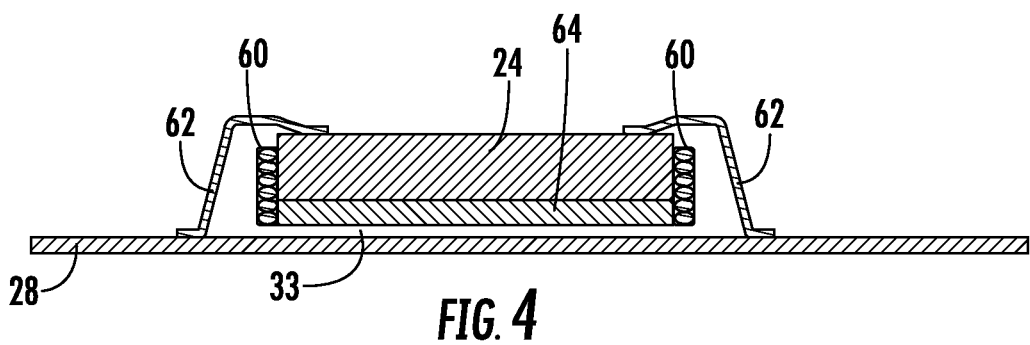
FIG. 4 is a cross-sectional side view of the temperature sensitive component illustrated in FIG. 2 with the thermal switch in a decoupled state.

The thermal switch 30 may be configured as an electromagnetically operated actuator. Referring now to FIGS. 2-4, one embodiment of the electromagnetically operated actuator will be discussed. The electromagnetically operated actuator comprises a solenoid coil 60, and at least one flexure mount 62 coupled between the temperature sensitive component 24 and the thermal radiator 28. In the illustrated embodiment, two flexure mounts 62 are used.

When an electrical current is applied to the solenoid coil 60, the flexure mounts 62 are switched on, as illustrated in FIG. 3. When the flexure mounts 62 are switched on, the temperature sensitive component 24 is thermally coupled to the thermal radiator 28.

To increase the thermal conductance between the temperature sensitive component 24 and the thermal radiator 28, a compressible thermal interface layer 64 is carried by the temperature sensitive component 24. Alternatively, the compressible thermal interface layer 64 may be carried by the thermal radiator 28.

The compressible thermal interface layer 64 makes contact with the thermal radiator 28 and the temperature sensitive component 24 when the thermal switch 30 is in the coupled state. The compressible thermal interface layer 64 may be indium foil, for example. In another embodiment, the compressible thermal interface layer 64 may be a thermally conductive pad that is compressible. The thermally conductive pad is compressible since it includes nanotubes or heat springs, for example. A thickness of the compressible thermal interface layer 64 may be within a range of 3 to 5 mils thick, for example.

When the electrical current is not being applied to the solenoid coil 60, the flexure mounts 62 are switched off as illustrated in FIG. 4. When the flexure mounts 62 are switched off, a vacuum gap 66 is between the temperature sensitive component 24 and the thermal radiator 28.

The electromagnetic force required to activate the electromagnetically operated actuator from the decoupled state to the coupled state is based on the following equation:

$$F = [N^* I^* \mu o^* \mu(\text{metal in electromagnet})^* A]/[2^* \text{gap}^2]$$

where,

N is the number of turns of the solenoid coil 60,

I is current applied to the solenoid coil 60,

μo is the permittivity of the vacuum gap 66,

μ(IF material) is the permittivity of the compressible thermal interface layer 64, A is the contact surface area of the temperature sensitive component 24, and gap is the size of the vacuum gap 66.

An example electromagnetic force for a temperature sensitive component 24 having a 0.11 cm² contact surface area is between 30 to 35 psi. In the illustrated thermal switch 30, application of an electrical current causes the temperature sensitive component 24 to be thermally coupled to the thermal radiator 28. This configured is preferred when the thermal switch 30 is in a normally powered off state. Alternatively, if the thermal switch 30 is in a normally powered on state, then operation of the thermal switch 30 may be reversed. In this case, application of an electrical current causes the temperature sensitive component 24 to be thermally decoupled from the thermal radiator 28.

Figure 5:
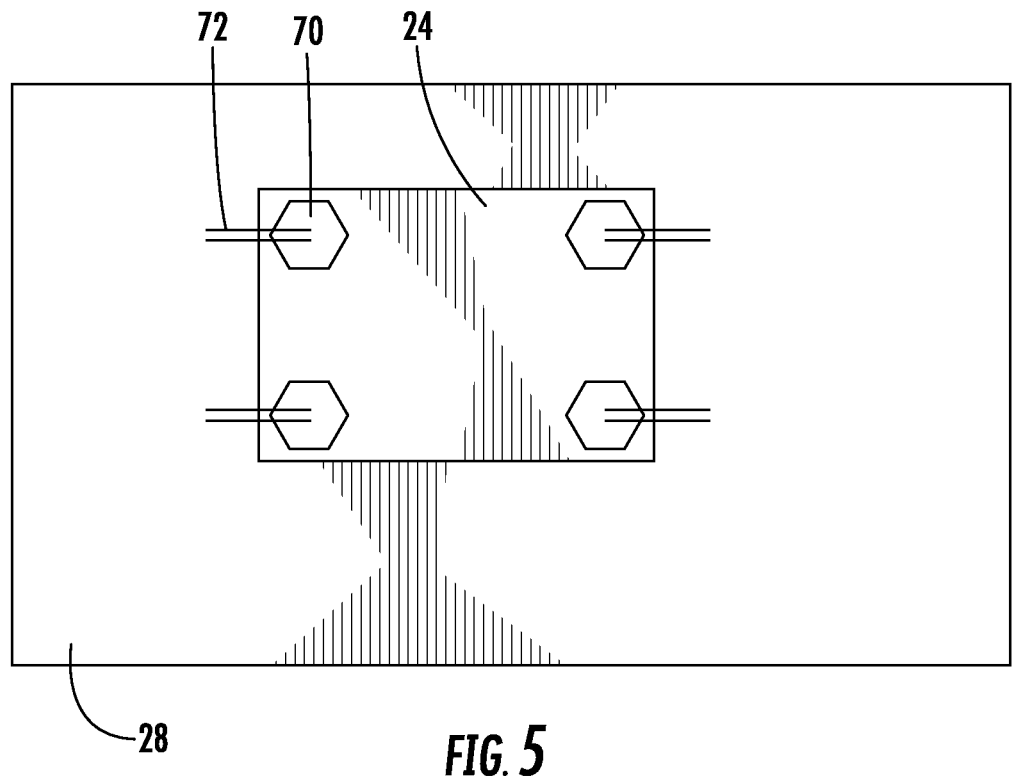
FIG. 5 is a top view of the temperature sensitive component illustrated in FIG. 1 with another embodiment of the thermal switch.
Figure 6:
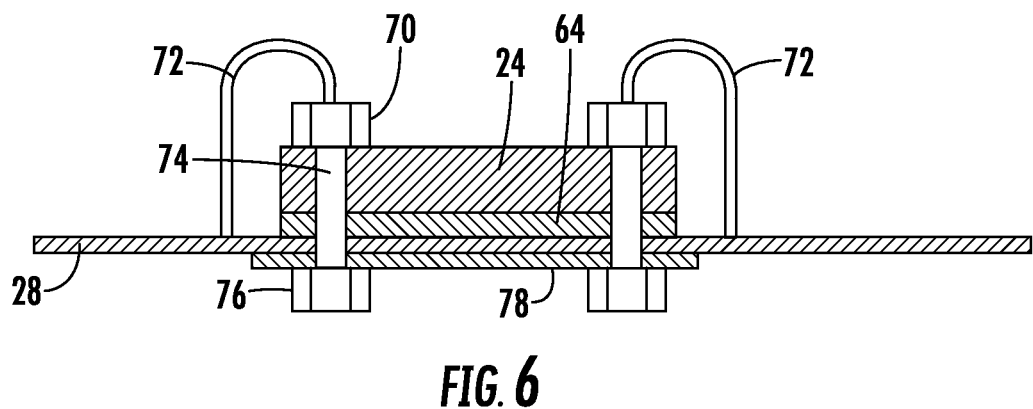
FIG. 6 is a cross-sectional side view of the temperature sensitive component illustrated in FIG. 5 with the thermal switch in the coupled state.

Referring now to FIGS. 5-6, another embodiment of the electromagnetically operated actuator will be discussed. The electromagnetically operated actuator comprises at least one solenoid fastener 70 coupled between the temperature sensitive component 24 and the thermal radiator 28. In the illustrated embodiment, four solenoid fasteners 70 are used, one adjacent each corner of the temperature sensitive component 24.

Each solenoid fastener 70 includes activation wires 72 contacting an electromagnetic solenoid bolt 74, and a fastener 76 on the back side of the thermal radiator 28. A conductive plate 78 may be included on a backside of the thermal radiator 28, as illustrated.

When an electrical current is applied to the activation wires 72, the electromagnetic solenoid bolts 74 are switched on, as illustrated in FIG. 3. When the electromagnetic solenoid bolts 74 are switched on, the temperature sensitive component 24 is thermally coupled to the thermal radiator 28. When the electrical current is not being applied to the activation wires 72, the electromagnetic solenoid bolts 74 are switched off so that a vacuum gap is between the temperature sensitive component 24 and the thermal radiator 28.

Figure 7:
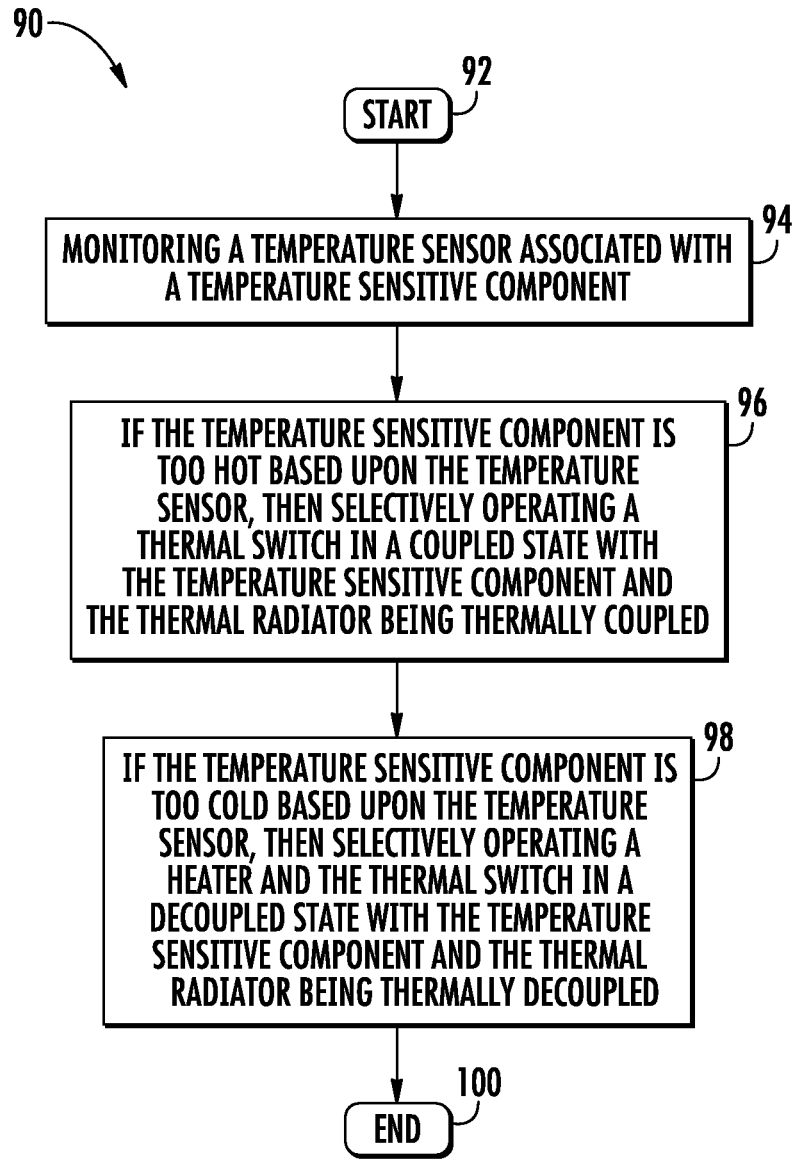
FIG. 7 is a flowchart illustrating a method of maintaining the temperature sensitive component illustrated in FIG. 1 within a temperature range.

Referring now to FIG. 7, a method of maintaining a temperature sensitive component 24 of a satellite 20 within a temperature range will be discussed in reference to the flowchart 90 in FIG. 7. From the start (Block 92), the method includes monitoring a temperature sensor 42 associated with the temperature sensitive component 24 at Block 94. If the temperature sensitive component 24 is too hot based upon the temperature sensor 42, then a thermal switch 30 is selectively operated at Block 96 to a coupled state with the temperature sensitive component 24 and the thermal radiator 28 being thermally coupled. If the temperature sensitive component 24 is too cold based upon the temperature sensor 42, then a heater 32 and the thermal switch 30 are selectively operated at Block 98 to a decoupled state with the temperature sensitive component 24 and the thermal radiator 28 being thermally decoupled. The method ends at Block 100.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of maintaining a temperature sensitive component of a satellite within a temperature range, the satellite comprising a thermal radiator, an electrically powered heater, and a thermal switch movable between a coupled state with the temperature sensitive component and the thermal radiator being thermally coupled, and a decoupled state with the temperature sensitive component and the thermal radiator being thermally decoupled, the method comprising:
moving the thermal switch to the coupled state when a sensed temperature of the temperature sensitive component is above the temperature range; and
operating the electrically powered heater to heat the temperature sensitive component and move the thermal switch to the decoupled state when the sensed temperature of the temperature sensitive component is below the temperature range.

2. The method according to claim 1 wherein the thermal switch, when in the decoupled state, defines a vacuum gap between the temperature sensitive component and the thermal radiator.

3. The method according to claim 1 wherein the thermal switch comprises an electromagnetically operated actuator.

4. The method according to claim 3 wherein the electromagnetically operated actuator comprises a solenoid coil, and at least one flexure mount coupled between the temperature sensitive component and the thermal radiator.

5. The method according to claim 3 wherein the electromagnetically operated actuator comprises at least one solenoid fastener coupled between the temperature sensitive component and the thermal radiator.

6. The method according to claim 1 comprising positioning a compressible thermal interface layer between the temperature sensitive component and the thermal radiator when the thermal switch is in the coupled state.

7. The method according to claim 1 wherein the temperature sensitive component comprises an electronic circuit device.

8. The method according to claim 1 wherein the temperature sensitive component comprises a battery.

9. A method of maintaining a temperature sensitive component of a satellite within a temperature range, the satellite comprising a temperature sensor coupled to the temperature sensitive component, a thermal radiator, an electrically powered heater, and a thermal switch movable between a coupled state with the temperature sensitive component and the thermal radiator being thermally coupled, and a decoupled state with the temperature sensitive component and the thermal radiator being thermally decoupled, the method comprising:
operating a controller coupled to the temperature sensor, electrically powered heater, and thermal switch to
move the thermal switch to the coupled state when a sensed temperature of the temperature sensitive component is above the temperature range, and
operate the electrically powered heater to heat the temperature sensitive component and move the thermal switch to the decoupled state when the sensed temperature of the temperature sensitive component is below the temperature range.

10. The method according to claim 9 wherein the thermal switch, when in the decoupled state, defines a vacuum gap between the temperature sensitive component and the thermal radiator.

11. The method according to claim 9 wherein the thermal switch comprises an electromagnetically operated actuator.

12. The method according to claim 11 wherein the electromagnetically operated actuator comprises a solenoid coil, and at least one flexure mount coupled between the temperature sensitive component and the thermal radiator.

13. The method according to claim 11 wherein the electromagnetically operated actuator comprises at least one solenoid fastener coupled between the temperature sensitive component and the thermal radiator.

14. The method according to claim 9 comprising positioning a compressible thermal interface layer between the temperature sensitive component and the thermal radiator when the thermal switch is in the coupled state.

15. The method according to claim 9 wherein the temperature sensitive component comprises an electronic circuit device.

16. The method according to claim 9 wherein the temperature sensitive component comprises a battery.

17. A temperature control system for a temperature sensitive component of a satellite, the satellite comprising a thermal radiator, and an electrically powered heater associated with the temperature sensitive component, the temperature control system comprising:
a thermal switch movable between a coupled state with the temperature sensitive component and the thermal radiator being thermally coupled, and a decoupled state with the temperature sensitive component and the thermal radiator being thermally decoupled; and a controller configured to
move the thermal switch to the coupled state when a sensed temperature of the temperature sensitive component is above a temperature range, and
operate the electrically powered heater to heat the temperature sensitive component and move the thermal switch to the decoupled state when the sensed temperature of the temperature sensitive component is below the temperature range.

18. The temperature control system according to claim 17 wherein the thermal switch, when in the decoupled state, defines a vacuum gap between the temperature sensitive component and the thermal radiator.

19. The temperature control system according to claim 17 wherein the thermal switch comprises an electromagnetically operated actuator.

20. The temperature control system according to claim 17 wherein the temperature sensitive component comprises an electronic circuit device.

21. The temperature control system according to claim 17 wherein the temperature sensitive component comprises a battery.

* * * * *